US010266610B2

(12) United States Patent
Varhimo et al.

(10) Patent No.: US 10,266,610 B2
(45) Date of Patent: Apr. 23, 2019

(54) METHOD OF PROCESSING AND FRACTIONATING BIOMASS AND USE OF FRACTIONS THUS OBTAINED

(71) Applicant: Teknologian tutkimuskeskus VTT Oy, Espoo (FI)

(72) Inventors: Antero Varhimo, Espoo (FI); Matti Siika-Aho, Espoo (FI); Jari Sirviö, Espoo (FI); Sari Liukkonen, Espoo (FI); Marjo Määttänen, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 0 days.

(21) Appl. No.: 15/521,310

(22) PCT Filed: Oct. 19, 2015

(86) PCT No.: PCT/FI2015/050707
§ 371 (c)(1),
(2) Date: Apr. 24, 2017

(87) PCT Pub. No.: WO2016/062919
PCT Pub. Date: Apr. 28, 2016

(65) Prior Publication Data
US 2017/0298152 A1  Oct. 19, 2017

(30) Foreign Application Priority Data

Oct. 24, 2014  (FI) ...................................... 20145935

(51) Int. Cl.
| | |
|---|---|
| *D21C 3/02* | (2006.01) |
| *C08B 37/00* | (2006.01) |
| *D21C 1/02* | (2006.01) |
| *D21C 5/00* | (2006.01) |
| *D21C 9/147* | (2006.01) |
| *D21C 9/16* | (2006.01) |
| *D21C 11/00* | (2006.01) |
| *C08H 7/00* | (2011.01) |
| *C08H 8/00* | (2010.01) |
| *C08B 37/14* | (2006.01) |
| *C08B 1/00* | (2006.01) |
| *D21C 9/00* | (2006.01) |

(52) U.S. Cl.
CPC .......... *C08B 37/0057* (2013.01); *C08B 37/14* (2013.01); *C08H 6/00* (2013.01); *C08H 8/00* (2013.01); *D21C 1/02* (2013.01); *D21C 3/02* (2013.01); *D21C 5/00* (2013.01); *D21C 9/147* (2013.01); *D21C 9/163* (2013.01); *D21C 11/0007* (2013.01); *C08B 1/00* (2013.01); *D21C 9/00* (2013.01)

(58) Field of Classification Search
USPC ........................................................ 162/24
See application file for complete search history.

(56) References Cited

U.S. PATENT DOCUMENTS

| 4,045,279 A | 8/1977 | Nagano et al. |
| 2002/0148575 A1 | 10/2002 | Wingerson |
| 2008/0032344 A1 | 2/2008 | Fallavollita |

FOREIGN PATENT DOCUMENTS

| AU | 451395 B2 | 8/1974 |
| CN | 102603504 A | 7/2012 |
| WO | WO8201019 A1 | 4/1982 |
| WO | WO 9403646 | 2/1994 |
| WO | WO0159204 A1 | 8/2001 |
| WO | WO 2004081185 A2 | 9/2004 |
| WO | WO 2011061400 A1 | 5/2011 |
| WO | WO2011066487 A1 | 6/2011 |

OTHER PUBLICATIONS

Browning—Methods of wood chemistry. Interscience Publishers, vol. 2, 1967, pp. 1-882.
Gomez-Tovar et al.—Chemical and enzymatic sequential pretreatment of oat straw for methane production. Bioresource Technology. vol. 116, 2012, pp. 372-378.
Kallioinen et al.—A novel alkaline oxidation pre-treatment for spruce, birch and sugar cane bagasse. Bioresource Technology 140, 2013, pp. 414-420.
Puls et al.—Biotechnical utilization of wood carbohydrates after steaming pretreatment. Applied Microbiology and Biotechnology, 1985, pp. 416-423.
Rovio et al.—Catalysed alkaline oxidation as a wood fractionation technique. BioResources 7(1), 2012, pp. 756-776.
Sun et al.—Characteristics of degraded cellulose obtained from steam-exploded wheat straw. Carbohydrate research. vol. 340, 2005.
Tenkanen et al.—An a-glucoronidase of Schitzophyllum commune acting on polymeric xylan. Journal of Biotechnology, vol. 78, 2000, pp. 149-161.

*Primary Examiner* — Mark Halpern
(74) *Attorney, Agent, or Firm* — McCormick, Paulding & Huber LLP

(57) ABSTRACT

The present invention relates to a method of treating biomass, comprising providing a lignocellulosic biomass feedstock; contacting the biomass feedstock in a mixture, which is formed by the biomass, water and an alkaline agent, with an oxidizing agent at an elevated temperature; and continuing the contacting of the biomass feedstock with the oxidizing agent until a notable part of the lignin is solubilized. The step of providing the biomass feedstock comprises contacting a biomass raw-material containing cellulose, hemicellulose and lignin in an aqueous phase with an alkaline agent; continuing the contacting of the biomass with the alkaline agent until a significant portion of the hemicellulose is dissolved in the aqueous phase to provide a modified biomass; recovering the modified biomass; optionally opening the structure of the modified biomass by mechanical treatment; and using the modified biomass as a lignocellulosic biomass feedstock. Treating the biomass provides hemicellulose, lignin and cellulose fractions that have a multitude of applications in the bioeconomy.

24 Claims, 1 Drawing Sheet

METHOD OF PROCESSING AND FRACTIONATING BIOMASS AND USE OF FRACTIONS THUS OBTAINED

This application is a 371 of PCT/FI2015/050707 filed 19 Oct. 2015

TECHNICAL FIELD

The present invention relates to the treatment of biomass. In particular the present invention relates to a method of processing and fractionating biomass for the provision of various products having e.g. applications in the bioeconomy, in particular for use as raw-materials of in other processes, e.g. in bioprocessing, as chemicals, as biofuels and as additives in fuels, just to mention a few utilities.

BACKGROUND ART

Conversion of biomass to value-added products, especially to different forms of energy has received growing attention as a mean of replacing energy and other end-products derived from fossil raw materials. For instance, of the conventional biofuels for transport (ethanol, ETBE, pure vegetable oil, biodiesels and biomethane), ethanol has a long proven history and in some cases also environmental advantages compared to fossil fuels. In addition, biomass is considered a major renewable source for bulk chemicals and materials.

Biomass can also be converted into various chemicals by fractionating processes yielding its components either in native or modified (e.g. hydrolysed or oxidised) form. The mixture of components obtained by such a conversion can be used as chemicals as such or after further processing. The further processing methods can be physical or mechanical (e.g. fractionation and separation), chemical (e.g. use of components as raw materials for synthesis or chemical modifications) or biochemical (e.g. fermentation processes or enzymatic modification). It is thus possible to utilise all the most abundant components of biomass: cellulose (or glucose derived from it), hemicellulose (or sugars or oligosaccharides derived from it), lignin (or its fragments) and minor biomass components depending on the specific raw materials used (e.g. proteins. pectins, extractives), and their degradation products.

Conventional methods of fractionation of biomass in order to produce sugars by enzyme hydrolysis or products based on further processing of sugars require a pretreatment to be carried out e.g. to render the biomass amenable to hydrolysis.

International Patent Application WO 1994/03646 describes a method of pretreating lignin-containing biomass to render the biomass amenable to digestion. In the method water and calcium hydroxide and optionally oxygen containing gas are added to the biomass at a temperature of 40 to 150° C. and an elevated pressure at a pH between 8.5 and 10.5. The aim of the known method is achieve oxidation without degradation of the lignocellulose.

WO 2004/081185 describes methods of hydrolysing lignocellulose at mild or moderate conditions, such as at a temperature of about 10 to 90° C. and a pH of about 4.0 to 10.0. A treatment using e.g. sodium percarbonate or $Na_2CO_3$ in a pre-treatment step is shown to increase sugar yield when compared to sole enzymatic treatment. A wide range of oxidizing agents, including hydrogen peroxide, sodium and calcium hypochlorite and potassium permanganate, are used in the examples.

An improved pretreatment method is disclosed in International Patent Application No. WO 2011/061400, which describes a process wherein lignocellulosic material and an alkaline agent are treated with an oxidising agent in water to produce a solid fraction with reduced lignin content and a liquid fraction comprising lignin.

Oxidation of chips at alkaline conditions as a pretreatment method is discussed by Rovio, S. et al. and Kallioinen A, et al. Further art is disclosed in US 2002/148575, CN 102603504, US 2008/032344, Sun et al. and Alatriste-Mondragon, F. et al.

The main difficulties associated with existing techniques are incomplete decomposition or modification of the lignocellulosic material and the formation of toxic compounds during pre-treatment, which makes the further processing less feasible and inefficient. In particular, the crude hemicellulose or cellulose filtrate from conventional pretreatments usually contains various degradation products of lignocellulose. These can be lignin and sugar decomposition products, including furfural, hydroxymethyl furfural and formic and acetic acid. Most of these components are toxic to enzymes and microorganisms and will slow any subsequent hydrolysis and fermentation process. Ineffective enzymatic hydrolysis step reduces the process economy remarkably.

SUMMARY OF INVENTION

Technical Problem

It is an aim of the present invention to provide a method of treating biomass by fractionation of biomass, yielding fractions suitable for use as raw materials in further processes.

It is a further aim of the present invention to provide a sulphur-chemical-free method of fractionating a biomass raw material to yield a first fraction comprising hemicellulose or products from it (e.g. mono or oligo saccharides), a second fraction comprising sulphur-free oxidised lignin and a third fraction primarily comprising cellulose.

Solution to Problem

It has surprisingly been found that treating a biomass raw material in an aqueous phase under conditions which will allow for separation of hemicelluloses from the raw material provides not only a hemicellulosic solution but also a modified biomass, which is suitable as a lignocellulosic biomass feedstock in an alkaline oxidation method of treating biomass.

The biomass feedstock, optionally after defibration or another mechanical processing step which opens up the raw-material, is contacted with an oxidising agent in a mixture formed of the biomass, water and an alkaline agent. The contacting with the oxidising agent is continued until at least a part of the lignin is solubilised in an aqueous oxidised lignin fraction and solid pulp cellulose fraction is formed.

More specifically, the method according to the present invention is characterised by what is stated in claim 1.

Advantageous Effects of Invention

Considerable advantages are obtained by the present invention. In the present invention, wood chips can be used as a raw-material. Such a feedstock is advantageous because it is readily available and industrially produced. It has been found that wood chips are difficult to process and, as a result, they tend to become inhomogeneously treated. This can be avoided by the present invention.

The present invention provides a method for efficiently and cleanly fractionating biomass under moderate conditions without the use of catalysts, to provide three essentially-distinct value-added fractions that are suitable as feedstocks in further processes. In the disclosed 2-step process, the components of the biomass are enriched into process streams from which they can readily be isolated in suitable pure form. For example sulphur free lignin can be recovered from the oxidized biomass of the second processing in pure form using e.g. membrane separation steps. Liquid compositions of lignin can be obtained which contain only minor amounts of oligosaccharides and small molecular weight carboxylic acids. For example from spruce lignins with molar masses 5000 to 10.000, in particular of 6000 to 7000 g/mol can be obtained.

Similarly, hemicelluloses can be recovered as a pure or essentially pure aqueous composition or solution already from the non-oxidized raw-material, and subjected to further processing.

Cellulose fraction with minor amount of hemicellulose and lignin can be produced with such characteristics that it can be hydrolysed to sugars by substantially lower enzyme dosage than for example cellulose fractions produced by conventional methods, such as steam explosion or other hydrothermal pretreaments.

The ratio between the contents of various components in different streams can be adjusted, which provides for tailoring of the process to meet the feed requirements for various down-stream processing of the hemicelluloses, lignin and cellulose.

Thus, in summary: with the present fractionation process based on alkaline oxidation, wood chips can readily be used as raw material, however the method is suitable also for straw and other annual, perennial and biennial plants; a hemicellulose fraction be recovered, in particular in a pure form, and the compositions of the various fractions can be controlled by adjusting the reaction conditions of the first and the second steps.

Other features and advantages will become apparent from the following description.

BRIEF DESCRIPTION OF DRAWINGS

Next the invention will be examined more closely with the aid of a detailed description and with reference to the attached drawings, in which.

DESCRIPTION OF EMBODIMENTS

Figure 1:
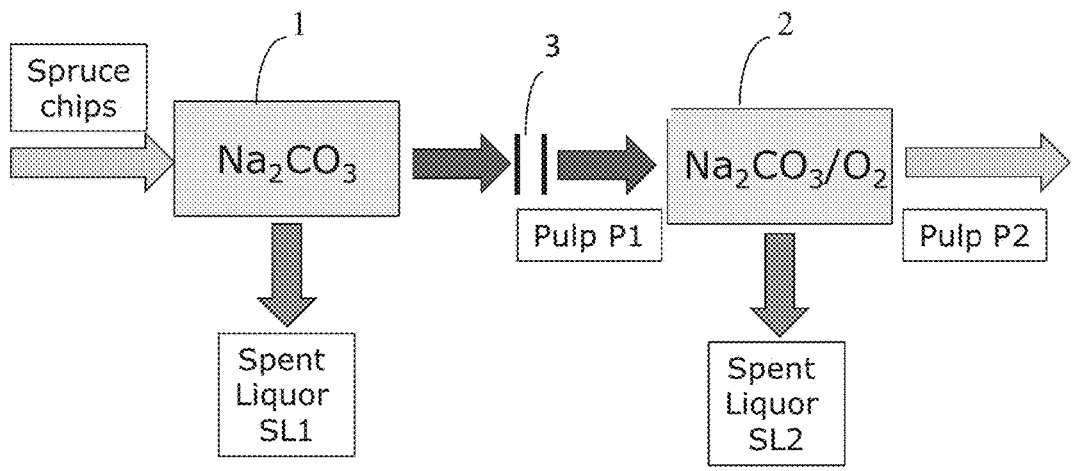
FIG. 1 depicts in a schematic fashion a process scheme according to an embodiment of the invention.

As mentioned above, the method of the present invention provides a means for the fractionation, in particular non-sulphurous fractionation, of biomass such as forest-based biomass into its three main components, hemicellulose, lignin and cellulose, in native or modified, e.g. in hydrolysed or oxidised form. The fractionation is carried out in aqueous phase in a hemicellulose dissolution step providing a lignocellulosic biomass feedstock, and an alkaline agent and an oxidising agent in a lignin solubilisation step.

Further embodiments relate to method steps in which recovered fractions of the biomass are used.

Basically, the present method of treating and fractionating biomass comprises in a preferred embodiment the combination of the following steps:
providing a lignocellulosic biomass feedstock containing cellulose, hemicelluloses and lignin;
dispersing the biomass feedstock in an aqueous phase;
dissolving at least a part of the hemicelluloses from the biomass into the aqueous phase to provide a first product stream which is enriched with hemicellulose;
contacting the modified biomass in an aqueous phase with an oxidizing agent in the presence of an alkaline agent at an elevated temperature;
continuing the contacting of the biomass with the oxidizing agent until a part of the lignin is solubilised to provide a second product stream which is enriched with lignin; and
recovering the cellulose-enriched biomass remaining after solubilisation of lignin.

Thus, the present invention comprises at least one first processing stage and at least one second processing stage. In the first processing stage, the biomass feedstock is processed to enhance accessibility of the feedstock to the oxidation treatment of the second processing stage. In the second processing stage, the feedstock is then treated in oxidative conditions to solubilize at least a part of the lignin in the feedstock so as to provide a cellulose-rich fibrous material.

In a preferred embodiment, the first processing stage also serves to remove at least a part of the most readily separated components of the biomass, typically the hemicelluloses, along with potentially some lignin. The hemicellulosic solution is optionally recovered before further processing. The hemicellulosic solution typically contains polymeric hemicelluloses and oligosaccharides or degradation products derived from it.

Optionally, the material produced in the first processing stage can be defibrated in an equipment opening its structure by mechanical action, especially in a pulp refiner. The defibering can be carried out either before or after the separation of the hemicellulosic solution.

Both the first and the second processing stages can comprise one or more actual reaction or process steps. In case of multistep processes in either or both of the two processing stages, the individual reaction or process steps are preferably carried out in a cascade, i.e. in a serial arrangement.

The attached drawing illustrates the above explained preferred embodiment.

Thus, in the drawing, biomass is exemplified by spruce chips. As will be discussed below, various other feedstocks can be used as well. The chips are fed into a first stage 1 where they are contacted with water. In the option shown in the drawing, which is however non-limiting, the chips are contacted in the aqueous medium with an alkaline agent, such as alkali metal carbonate. During the first stage 1, hemicelluloses and possible some lignin are separated from the raw-material as they dissolve into the liquid phase. The liquid phase is removed and forms a first separated fraction, viz. the Spent Liquor, SL1, which predominantly contains hemicelluloses dissolved in water.

The solid material is conducted to an optional defibration stage 3 forming a modified pulp P1.

Pulp P1 is then fed into the second main stage 2 of the process wherein it is contacted with an oxidization agent in the presence of an aqueous alkaline agent, such as sodium carbonate.

Two fractions are withdrawn from Stage 2, viz. a second Spent Liquor fraction, SL2, which contains mainly lignin which has dissolved into the alkaline phase, and a solid material portion, Pulp P2, which is enriched in cellulose and which can be used for further processing or which can be recovered and used as such.

Turning next to the various stages of the processes, the following can be noted with regard to the first processing stage, the treatment of the raw-material in aqueous phase to solubilize hemicellulose:

According to a preferred embodiment of the invention the raw biomass material forming the feedstock of the process and containing cellulose, hemicellulose and lignin, is contacted with an aqueous phase. The aqueous phase may contain an alkaline agent selected from the group of alkali metal carbonates, bicarbonates, hydroxides and percarbonates and combinations thereof. The treatment of the biomass feedstock in the aqueous phase is continued until a significant portion, typically at least 20% by weight, of the hemicellulose is dissolved to provide a modified biomass. The biomass is preferably recovered and used as a lignocellulosic biomass feedstock.

It should be pointed out that although an alkaline agent is advantageous for effecting hemicellulose dissolution and removal, hemicelluloses can also be leached from the biomass using conditions of pressurized hot water extraction. Thus, the biomass can be, in the first processing step, suspended in water at substantially neutral pH (a pH of roughly 6 to 8), and then the dispersion obtained is heated at temperatures typically of 140° C. to 180° C. for 0.5 to 3 h.

For the purposes of the present invention, with regard to both the alkaline and the neutral leaching disclosed above, the term "significant portion" means at least 20%, typically in excess of 30%, preferably from 40% to 90%, particularly from 50% to 70% by dry weight of the hemicelluloses present in the original biomass before treatment.

In the first stage, the temperature is typically 40 to 200° C., preferably 80° C. to 190° C., suitably 120° C. to 180° C., particularly 130° C. to 170° C., most suitably 140° C. to 150° C. The treatment time is of 30 min to 20 hours, preferably 1 to 5 hours, suitably 1.5 to 3 hours, most suitably ca. 2 hours.

In the first stage, any alkaline agent is added in an amount of 0 to 7.0 mol/kg, preferably 0.2 to 4.0 mol/kg, particularly 0.5 to 3.0 mol/kg, suitably 2.0 mol/kg biomass raw material.

The above indicated reaction conditions are generally applicable for various raw-materials. They are, however, particularly suitable for raw-material of coniferous wood species, such as spruce.

After the first stage processing, it is preferred to subject the biomass to a treatment which mechanically modifies the hemicellulose-depleted biomass feedstock to enhance its reactivity in the next stage. The mechanical treatment can comprise defibration or another mechanical treatment which primarily acts physically upon the material.

As defined herein the term defibering is understood as opening of the structure of the biomass feedstock. Defibering can be carried out by grinding, by milling, by refining or by crushing.

Generally, defibering is carried out without extensive cutting or breaking of the fibrous material. To achieve an opening action with a conventional refiner, the distance between the refiner plates is adjusted to a value typically in the range of 0.5 to 15 mm, in particular 1 to 12.5, for example 2 to 10 mm.

In addition to equipment with cutting edges, it is possible to use roller nips, optionally provided with grooves or ridges.

When the hemicellulose-depleted material is subjected to repeated mechanical concussions, which direct a pressure towards the fiber structure of the material the pressure causes the structure of the raw-material to open. Opening of the fiber structure is enhanced by removal of water from the fibers as a result of the pressure shocks directed to the material.

Generally, the pulp (modified biomass) obtained after the defibering stage exhibits sheet forming properties. This is a measure for the extent of the defibering stage. For example, disc refiners will provide suitable defibering when using disk clearances such as 0.5 to 5 mm, in particular 0.5 to 2 mm.

After the optional mechanical opening of the structure of the hemicellulose-depleted material, the biomass feedstock is then contacted in a mixture, which is formed by the biomass, water and an alkaline agent selected from the group of alkali metal carbonates, hydroxides and percarbonates and mixtures thereof, with an oxidizing agent at an elevated temperature; and contacting of the biomass feedstock with the oxidizing agent is continued until a notable part of the lignin is solubilised.

For the purposes of the present invention the phrase "a notable part of the lignin is solubilised" means that in excess of 25%, preferably in excess of 40%, especially in excess of 50%, suitably in excess of 65%, particularly in excess of 80% of the lignin is solubilised. This provides material with reduced lignin content, preferably with lignin content less than 75% of the lignin content of the starting material, and particularly less than half of the lignin content of the starting material.

For clarity, the pulp cellulose fraction may contain varying amounts of hemicellulose and lignin. The content of hemicellulose and especially lignin can be controlled by selecting the processing conditions.

In a preferred embodiment of the second stage of the process, the alkaline agent is provided at 0.1 to 7.0 mol/kg, preferably 0.2 to 4.0 mol/kg, particularly 0.5 to 3.0 mol/kg, suitably 2.0 mol/kg of the hemicellulose-depleted biomass.

In a particularly preferred embodiment at least a portion of the contacting alkaline agent in the is selected from the group of sodium carbonate, sodium bicarbonate, sodium percarbonate or mixtures thereof, optionally together with an alkali metal hydroxide, such as sodium hydroxide.

In one embodiment the contacting alkaline agent in the step of contacting the biomass feedstock is sodium carbonate.

In a preferred embodiment, the alkaline oxidation step is carried out at a temperature of 60° C. to 200° C., preferably 100° C. to 180° C., suitably 120° C. to 160° C., maintained for a period of 0.5 to 20 hours, preferably 0.75 to 4 hours, most preferably 1 to 2 hours.

In a suitable embodiment, the oxidising agent is selected from oxygen, air and oxygen containing compounds such as hydrogen peroxide, sodium hypochlorite, calcium hypochlorite and hydrogen peroxide.

In one embodiment, the step of oxidizing the biomass feedstock is carried out in conditions having a partial pressure of oxygen at 25° C. of 4 to 20 bar, preferably 8 to 12 bar, most preferably 10 bar.

The conditions of the method can be varied, for example in order to control the content of lignin in the cellulose fraction. The amount of lignin can for example be increased by decreasing the amount of alkaline agent, decreasing the temperature or decreasing the contact time. The content of hemicellulose can also be affected by selecting the treatment conditions.

Just as above was explained, in relation to stage 1, the above indicated reaction conditions are generally applicable for various raw-materials. They are, however, particularly suitable for raw-material of coniferous wood species, such as spruce.

Other agents which modify the reaction medium or components therein can also be added before or during stage 2. Examples include agents which regulate the properties of the solid fractions. In one particular embodiment, which is particularly interesting with regard to the production of fibrous raw-material suitable as a dissolving pulp, magnesium sulphate or other similar compounds are added in order to prevent or reduce hydrolysis of the polymeric chains during oxidation. In other word such agents are added to avoid a significant drop in viscosity of, in particular, the cellulosic fibrous material as a result of the processing. Typically, to that aim, magnesium sulphate is added in amounts of about 0.01 to 5 wt-%, calculated from the dry weight of the solid material fed into the stage 2.

After the treatment in oxidizing conditions, the oxidized biomass, which comprises hemicellulose- and lignin-depleted or cellulose-enriched solid residue, is then recovered. Recovery of the modified biomass from the aqueous phase can take place mechanically, e.g. by filtration.

In one embodiment the raw material for the present process is selected from the group of wood, waste or demolition wood, energy crops, pulp, recycled fibres, straw, sugar cane bagasse, agricultural, municipal and industrial wastes, including forestry residues and thinnings; agricultural residues, such as straw, bagasse, olive thinnings; energy crops, such as reed canary grass, willow, switchgrass, *Miscanthus*; peat; bagasse and sea biomass, and similar compositions which contain carbohydrates, or a mixture thereof.

The method is particularly advantageous when it is difficult to handle the material with traditional pretreatment processes. An example of such material is wood, especially softwood material, such as spruce or pine. Another example is hardwood, such as birch, beech, poplar, aspen and eucalyptus.

Another interesting raw-material is formed by demolition wood. Typically, such wood is provided as fractions having various compositions. Such fractions are assigned different classes. Class A1 samples typically contains relatively pure wood which can be used as such. Class A2/A3 contains contaminants (glass, metal, plastics) and larger particles (residues of fiber and particle boards, such as plywood and MDF, and wood). It is preferred to remove mineral, metal and plastic contaminants before using demolition wood as a raw-material of the present process.

As discussed above, the two-stage processing allows the use of wood chips as biomass raw material. The use of chips is advantageous since they are readily available and they can be produced industrially. Chips are not readily processible with acceptable results in a one-step process; rather an inhomogeneous material would then be obtained.

Based on the foregoing, in one preferred embodiment, the present technology provides a method of treating biomass raw material comprising cellulose, hemicellulose and lignin, in particular without the use of sulphur chemicals, the method comprising the steps of contacting the biomass raw material with water and an alkaline agent selected from alkali metal carbonates, alkali metal bicarbonates, alkali hydroxides, alkali metal percarbonates and mixtures thereof;

continuing the contacting until at least 20% by weight of hemicellulose is solubilized to obtain a solid phase comprising cellulose and lignin, and a liquid phase comprising hemicellulose or hemicellulose-derived compounds, optionally defibering the material, in particular in order to open its structure, contacting the solid phase comprising cellulose and lignin, obtained as disclosed above, with water, an alkaline agent and an oxidizing agent, and continuing the contacting until a notable part of the lignin is solubilized to obtain a solid phase comprising cellulose but less than 20 weight % of lignin, and a liquid phase comprising lignin and/or oxidized lignin.

Each of the separated three fractions can be processed separately, as will be discussed below.

The method of this invention is suitable for use in both fibrous and non fibrous applications alike.

A fibrous application is one in which a carbohydrate raw material is converted into products that are based on a fibrous network. A typical example of a fibrous application is paper manufacturing. Such applications are desirous of retaining fibres and carbohydrates, especially cellulose, without deleterious degradation. Non-fibrous applications comprise all applications that are not included in fibrous applications. One example of a non-fibrous application is as a starting material for biofuels, especially for ethanol, or other chemicals obtained by fermentation processes.

For the purposes of the present invention, the term "chemical" includes products of chemical industry, including biofuels, bulk and specialty chemicals, and non-fibrous structural materials (e.g. lignin used as a component in board and panels).

In a further embodiment the hemicellulose or products derived of hemicellulose are recovered from the aqueous phase for use as a raw material in further processes, e.g. in the production of biofuel or chemicals. The further processes can be mechanical, chemical, enzymatic or a combination thereof.

In a preferred embodiment the hemicellulose or hemicellulose derived products are subjected to hydrolysis, fermentation, oxidation or a combination thereof.

The recovered hemicellulose or hemicellulose derived products can be used for the production of a multitude of chemicals.

In one embodiment the hemicellulose can be used as polymers for production of derivatives, such as hemicelluloses ethers and esters. Hemicellulose or hemicellulose derived products can also be used for the production of oligomeric, in particular monomeric sugars, such as xylose, glucose, mannose and galactose.

The compounds from hemicellulosic solution can be recovered and used as such, for example as fine chemicals, as additives and in the food industry, or they can be used as raw-materials for other processes involving chemical or biochemical processing steps. Thus, e.g. glucose or mannose can be used in the production of ethanol by fermentation.

One embodiment further comprises the step of recovering cellulose and using it for the production of a biofuel. The cellulose fraction is subjected to a further treatment step selected from the group of mechanical treatments, chemical treatments and enzymatic treatments or combinations thereof. It should be understood that the cellulose subjected to a further treatment may still contain residual hemicelluloses and lignin.

In a preferred embodiment the cellulose fraction is subjected to hydrolysis, fermentation, oxidation or a combination thereof.

In a particular embodiment the cellulose fraction is used for the production of ethanol.

Moreover, one possible application is to use the cellulosic pulp obtained by the present invention, in particular the cellulosic pulp obtained after stage 2, as a raw material of regenerated cellulose. That cellulosic pulp, which is labelled P2, is depleted in hemicellulose and lignin and enriched in cellulose, and therefore suitable as a raw material of dissolving pulp, possibly after further processing or purification.

Additional purification of a cellulosic pulp obtained from the present process to adapt it to use as dissolving pulp can comprise the steps of removal of residual hemicellulose, residual lignin or both.

The regenerated cellulose can be produced from the present cellulosic pulp by commercial methods, including by the viscose process or by the Lyocell process. The carbamate process can also be employed. The present cellulosic pulps are also suitable as a raw-material for processes involving the use of ionic liquids or deep eutectic solvents for dissolution of cellulose.

The regenerated cellulose can be manufactured into fibres, filaments, films and sheets and various other articles and objects. Uses of the products are listed below.

One embodiment further comprises the step of recovering the lignin and using it for the production of a chemical product. The lignin is subjected to a further treatment step selected from the group of mechanical treatments, chemical treatments and enzymatic treatments or combinations thereof. Optionally, lignin which has been present as a minor part of cellulose fraction can also be recovered as a side product from hydrolysis as hydrolysis residue.

In a preferred embodiment the lignin is used as a raw material for chemical products.

In a particular embodiment the hemicellulose, cellulose or lignin, or all of them are used at least partially for energy production.

The chemicals used in the processing steps can also be readily recovered, for example the carbonates can be recovered and they can optionally be converted to the corresponding hydroxide compounds.

In a further embodiment the method of treating biomass is used in the production of biofuels, in a particular embodiment in the production of ethanol.

The following non-limiting working examples illustrate the invention.

As will appear, with embodiments of the present invention, after the first stage, pulp yields of about 80% can be obtained with brightness in the region of 14 to 18% and kappa numbers of 160 to 190. The chemical compositions of the pulps are, for example, total lignin: in the range of 25 to 35 wt-%, extractives: less than 0.2 wt-%, and total carbohydrates: about 55 to 60 wt-%.

After a second stage, carried out with $O_2/Na_2CO_3$, pulp fractions can be obtained at total yields of 40 to 60 wt-%, which kappa numbers that can vary broadly in the range of 10 to 100 and brightness of 15 to 50%. The chemical composition of the pulp can be as follows (exemplifying embodiments only): total lignin 2.5 to 20 wt-%, extractives: 0.01 to 0.20 wt-%, total carbohydrates (enz. hydr.): 60 to 80 wt-%.

EXAMPLES

Example 1

In one embodiment of the invention Norway spruce chips are treated in the first stage in a $Na_2CO_3$ solution to provide biomass feedstock for the second delignifying oxidative stage. The amount of $Na_2CO_3$ employed is 5 mol/kg at a liquor to wood ratio of 10:1. The chips are treated at 165° C. for 2 hours in an electrically heated rotating 15-liter digester. After the digestion the spent liquor is drained and the biomass is washed and defiberized in a non-pressurized disk refiner (8" Bauer with disk clearances 2 mm, 1 mm and 0.5 mm). The yield of the solid biomass fraction is 79.4%.

The resulting fibrous biomass is analysed for lignin content (from air-dried ground sample after heptane extraction by the Klason lignin method by hydrolysing with 72% sulphuric acid (Browning, 1967). The lignin content of the biomass is 30.7% i.e. clearly higher than that of the original spruce wood (27.1%). Thus about 90% of the original lignin is in the biomass feed to the second stage and the dissolved material is mainly derived from the polysaccharide fraction, especially hemicelluloses.

Example 2

In another embodiment of the invention the biomass feedstock provided in Example 1 is treated in a $Na_2CO_3$ solution and the suspension is mixed under 10 atm initial $O_2$ pressure to yield limited delignification of the feedstock. The amount of $Na_2CO_3$ employed is 4 mol/kg at a consistency of 10%. The reaction time is 0.5 h at 140° C. The overall yield of insoluble fraction calculated on the original spruce wood is 57.6% and the pH of the spent liquor is about 8.8.

The resulting fibrous biomass is analysed for lignin content as described in Example 1. The lignin content of the final biomass is 17.3% representing of about 37% of the original lignin in the starting raw material. The carbohydrate composition of the biomass is analysed after acid hydrolysis to monosaccharides (Puls et al., 1985). 100 mg of the solid fraction is hydrolysed by 1 ml of 72% sulphuric acid at 30° C. for 1 h. After addition of 28 ml water the material is autoclaved for 1 h at 120° C. and then analysed for sugar composition by HPLC (Tenkanen and Siika-aho, 2000). The results show that the glucose content of the solid fraction increases markedly and the polysaccharide-derived yield losses over the process mainly are caused by dissolution of spruce galactoglucomannan (Table 1).

TABLE 1

Carbohydrate composition (% dry weight) of the final biomass after limited delignification in the second alkaline oxidation stage. Analysis after acid hydrolysis by HPLC.

|  | Original spruce wood | After limited delignification in the 2$^{nd}$ stage |
| --- | --- | --- |
| Glucose | 46.5% | 64.4% |
| Xylose | 5.9% | 5.8% |
| Mannose | 12.6% | 4.1% |
| Galactose | 2.4% | 0.3% |
| Arabinose | 1.4% | 0.8% |

The final biomass is hydrolysed enzymatically to monosaccharides. The solid fraction is suspended into 50 mM sodium acetate buffer pH 5 into 10 mg/ml concentration. Enzymatic reaction is started by adding commercial cellulose mixture Celluclast 1.5 L FP 10 FPU/g dry weight and commercial β-glucosidase Novozym 188 200 nkat/g dry weight. Suspensions are incubated at 45° C. with magnetic stirring for 24 hours. The carbohydrate composition of hydrolysates is analysed by HPLC after the hydrolysis reaction as described above. The results show good hydrolysability, 83% of the neutral sugars are released as monosaccharides in the 24 h test.

Employing limited delignification for the biomass in the second stage provides thus a solid material with good hydrolysability in spite of its high lignin content. Large amounts of oxidised lignin can be recovered after the hydrolysis.

Example 3

An alternative option to process the biomass feedstock provided in Example 1 is to treat it in a $Na_2CO_3$ solution and mix the suspension under 10 atm initial $O_2$ pressure to yield extensive delignification of the feedstock. The amount of $Na_2CO_3$ employed is 5 mol/kg at a consistency of 10%. The reaction time is 2 h at 140° C. The overall yield calculated on the original spruce wood is 43.2% and the pH of the spent liquor is about 8.8.

The resulting fibrous biomass is analysed for lignin content and sugar content by HPLC as described in Example 2. The lignin content of the final biomass is 2.7% representing of about 4% of the original lignin in the starting raw material. A majority of the original lignin in the spruce wood material can thus be recovered as oxidised lignin in the spent liquor of the second stage. The carbohydrate analyses show that the glucose content of the solid fraction increases further by extending the delignification in the second stage (Table 2).

TABLE 2

Carbohydrate composition (% dry weight) of the final biomass after extensive delignification in the second alkaline oxidation stage. Analysis after acid hydrolysis by HPLC.

|  | Original spruce wood | After extensive delignification in the $2^{nd}$ stage |
| --- | --- | --- |
| Glucose | 46.5% | 78.5% |
| Xylose | 5.9% | 6.1% |
| Mannose | 12.6% | 3.6% |
| Galactose | 2.4% | 0.1% |
| Arabinose | 1.4% | 0.6% |

The final biomass is hydrolysed enzymatically to monosaccharides as described in Example 2. The results show excellent hydrolysability, practically all (more than 90 wt-% of) the neutral sugars are released in the 24 h test.

Employing extensive delignification for the biomass in the second stage provides thus a solid material with excellent hydrolysability. The main source to obtain oxidised lignin in this process alternative is the spent liquor of the second stage.

Example 4

An optional way to provide the biomass feedstock for the second delignifying oxidative stage is to treat the spruce chips in the first stage without employing $Na_2CO_3$. The stage can be carried out in liquid phase (water) or steam phase. The amount of material dissolved can be controlled by temperature and/or reaction time, commonly expressed as the P-factor. In a typical example the spruce chips are treated in an electrically heated rotating 15-liter digester at a liquor to wood ratio of 4:1, at 165° C. with a P-factor of 570. After the digestion the spent liquor is drained and the biomass is washed and defiberized in a non-pressurized disk refiner (8" Bauer with disk clearances 2 mm, 1 mm and 1 mm). The yield of the solid biomass fraction is 81.2% and the pH of the spent liquor about 3.8.

The resulting fibrous biomass is analysed for lignin content as described in Example 2. The dissolved material is mainly derived from the polysaccharide fraction, especially hemicelluloses.

The biomass feedstock provided is treated in a $Na_2CO_3$ solution and the suspension is mixed under 10 atm initial $O_2$ pressure to yield limited delignification of the feedstock. The amount of $Na_2CO_3$ employed is 4 mol/kg at a consistency of 10%. The reaction time is 0.5 h at 140° C. The overall yield calculated on the original spruce wood is 53.5% and the pH of the spent liquor is about 8.6.

Example 5

The alkaline oxidation process of wood chips according to prior art (AlkOx, described in WO2011/061400) is tested using the same spruce wood chips as in Examples 1-3. The chips are treated in a pressurized reactor equipped with a mixer. The amount of $Na_2CO_3$ employed is 5 mol/kg at a liquor to wood ratio of 20:1 and an oxygen pressure of 10 atm. The chips are treated at 140° C. for 4 hours. The pH in the spent liquor is 8.7. The solid fraction after the treatment is inhomogeneous with extensive delignification in the outer surfaces of the chips and unreacted material in the interior of the chips. The main reason for the phenomenon is the limited transfer of oxygen molecules into the chips due to low solubility of oxygen into the liquid phase. The yield of the solid fraction is about 70% and the lignin content about 20%.

Example 6

In another set of experiments, samples of Norway spruce (*Picea abies* (L.) Karst), common beech (*Fagus sylvatica* L.) and wheat straw (*Triticum* L.) were treated. Spruce and beech were used as chips and straw chopped to particles.

The first stage was done in 15 liter electronically heated rotating autoclaves employing only sodium carbonate: Constant carbonate charge (2 mol/kg) and a liquor to wood ratio of 4 to 5 l/kg, or 10 l/kg for low lignin spruce, were used. The mild process was performed in a temperature of 130° C. and a reaction time of 1 to 2 h and the severe one in a temperature of 130 to 165° C. and a reaction time of 2 h.

The solid fractions were defiberized in an atmospheric 8" Bauer disk refiner in three stages with disk clearances 2 mm, 1 mm and 0.5 mm.

The second stage of the process was carried out using 1st stage refined pulp. The treatments were made in a pressurized 40 L Zirco reactor equipped with a mixer. Constant carbonate charge (2 mol/kg), oxygen pressure (10 bar at room temperature), liquor to solids ratio (10 l/kg) and reaction temperature (140° C.) were used. Reaction time for Process Alt. 1 (a mild process modification) was from 1 to 2 h and for Process Alt. 2 (a more severe process) from 2 to 3 h.

Process yields varied from 50% to 60% of the original o.d. raw material (Table 1). The various raw materials were delignified differently, spruce being the most difficult and wheat straw the easiest one. The lignin contents of the solid fractions were close to the level of normal unbleached kraft pulp. Spruce and beech needed, however, more severe conditions to reach it.

TABLE 3

Properties of the solid fraction after 2-stage treatments

| | Raw material | | | | | |
|---|---|---|---|---|---|---|
| | Spruce | | | Beech | | Wheat straw |
| Process type | Alt. 1 | Alt. 2 | Low lignin | Alt. 1 | Alt. 2 | Alt. 1 |
| Total yield, % | 59.4 | 50.5 | 46.6 | 59.1 | 54.0 | 55.7 |
| Kappa number | 69.8 | 35.0 | 17.6 | 42.6 | 15.7 | 12.7 |
| Lignin, % | 14.0 | 6.9 | 4.4 | 8.1 | 3.5 | 3.8 |
| Brightness, % | 19.6 | 24.9 | 41.1 | 49.8 | 58.2 | 46.9 |

The severity of the treatment can be seen in the modification of carbohydrates of the fibre fraction (Table 2). With spruce material more galactoglucomannan is solubilized when the severity increases. The content of xylan remained more or less unchanged, whereas the content of cellulose increased when the lignin content decreased. The xylan content of beech and straw material remained or even slightly increased as a result of the treatment.

TABLE 4

Composition of carbohydrates of the solid fraction after 2-stage treatments

| Material | | Ara g/100 g | Gal g/100 g | Glu g/100 g | Xyl g/100 g | Man g/100 g | As monos. g/100 g | As polym. g/100 g |
|---|---|---|---|---|---|---|---|---|
| Spruce | Alt. 1 | 0.7 | 0.5 | 69.8 | 6.9 | 7.8 | 85.8 | 77.1 |
| | Alt. 2 | 0.7 | 0.3 | 77.9 | 7.4 | 5.6 | 92.0 | 82.6 |
| | Low lignin | 0.6 | 0.1 | 86.1 | 7.3 | 4.4 | 98.6 | 88.6 |
| Beech | Alt. 1 | 0.1 | 0.1 | 67.7 | 22.7 | 0.8 | 91.4 | 81.8 |
| | Alt. 2 | 0.0 | 0.0 | 72.0 | 23.9 | 0.5 | 96.5 | 86.4 |
| Wheat straw | Alt. 1 | 2.4 | 0.2 | 58.0 | 27.3 | 0.0 | 87.8 | 78.4 |

The treatment resulted in an easily hydrolysable fibre fraction.

Increasing severity, shown by a comparison of the results of Process Alt. 1 and Process Alt. 2, improved the hydrolysability. The cellulose of straw was practically totally hydrolysed within 24 h in the test conditions. The hydrolysability was clearly higher that that observed typically after steam explosion, which normally ranges from ca. 70-90%.

The spent liquors after the $2^{nd}$ stage contained substantial amounts of sulphur-free lignin (11-16 g/l as UV-lignin). In the case of spruce, the molar mass of the lignins was 6000-7000 g/mol, which is higher than those of commercial kraft lignins. The molar mass was higher in the lignins recovered from the spent liquors by acid precipitation. No monosaccharides were detected in the spent liquors, which typically contained small molecular weight carboxylic acids (8-12 g/l for spruce) and some carbohydrate as oligosaccharides (2.5-3 g/l).

As discussed above, a specific feature of the present fibre fractions obtained from alkaline oxidation is that the hydrolysis is not inhibited or stagnated with low enzyme dosages.

Figure 2:
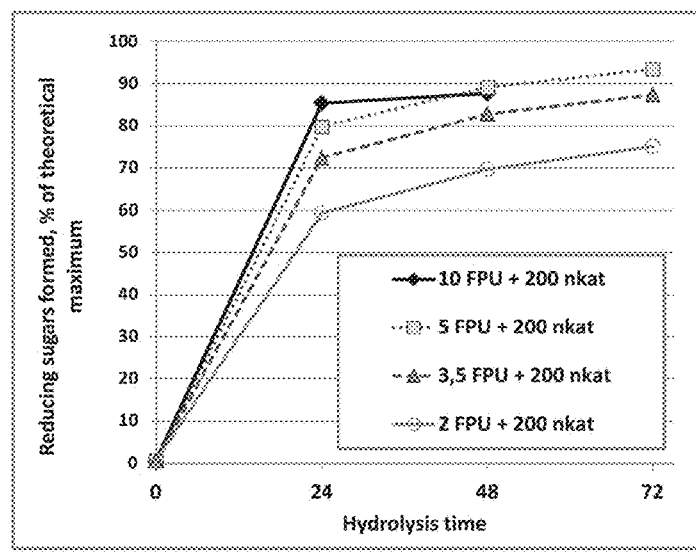
FIG. 2 shows in graphical form hydrolysis of the low lignin fibre fraction from a process according to an embodiment of the invention, using low cellulase dosages.

Consequently, given longer residence time, high degree of hydrolysis, amounting to for example up to 90% or more by weight of the starting material, can be obtained in very low enzyme dosages, as illustrated in FIG. 2. This results in significant savings in enzyme cost, for example when the present 2-stage process is used as a pretreatment in production of sugars as well as in the production of chemicals and other products by using sugars as raw-materials.

The pulp produced from wheat straw (Example 6, Alt. 1) which had a kappa value of 12.7 and a viscosity of 740 ml/g was useful as a raw material of a dissolving pulp.

Example 7

To study the usefulness of demolition wood as a raw-material, the following tests were carried out.

Raw-materials: A1 and A2/A3 Quality Recycled wood (RW); spruce chips were used as reference.

The first process stage was carried out in a 15 l rotating autoclaves. Conditions in the first stage:
 2 kg/od chips/batch
 Alkalinity: 2 mol/kg $Na_2CO_3$
 Temperature: 130 and 160° C.
 Reaction time: 2 h
 Liquor to wood: 4 l/kg The material thus treated was subjected to defibering with 8" Bauer lab scale disk refiner, to produce a defibered pulp which could be formed into a hand-sheet.

The second stage comprised using a Zirco reactor equipped with mixing (capacity 40 l, 0.6 kg o.d. pulp).

The second stage was carried out for samples of 600 g/batch at an alkalinity of 2 mol/kg $Na_2CO_3$ and at a temperature of 140° C. The reaction time was 2 h (Alt. A, "mild") and 3 h (Alt. B, "severe"), while aiming for a target kappa of 70 and 35, respectively. The oxygen load was 10 atm, and the liquor to wood ratio was 10 l/kg.

Pulp yield after the first stage was for spruce 86% after Alt. A treatment and 80.5% after Alt. B treatment. By comparison, RW A1 gave yields of 82.8% and 78.1%; RW A1 milled gave yields of 82.6% and 77.6%; and RW A2/A3 gave yields of 81.3% and 76.7%.

The total yield (and lignin content) after the first and second stages was 59.35% and 50.5% (kappa 35) for spruce, depending on severity of treatment (Alt. A or B), 56.7% and 47.8% (kappa 25) for RW A1; 50.6% and 47.9% (kappa 27) for RW A1 milled; and 55.9% and 46.5% (kappa 24) for RW A2/A3.

The results also showed that using demolition wood—or similar recycled wood raw-material—a highly hydrolysable fibre fraction and a liquid fraction with recoverable oxidized lignin can be obtained.

The tests showed that performance for reference material and recycled wood material was practically similar. A2/A3 grade was readily processable after manual removal of contaminants. Milder conditions resulted in higher overall sugar yields. Sugar yields were higher than using steam explosion and obtainable also with clearly lower enzyme dosage. The present 2-stage process provided for lignin recovery by precipitation and dialysis/ultra-filtration. Also in this case, lignin has high molar mass, low phenol content and more oxidized structure than commercial kraft or organosolv lignins. Thus, the actual raw material (fresh feed or recycled) has no significant effect.

Example 8

The cellulose fraction obtained in Example 6, Alt. 2, starting from beech chips, was a pulp which had a kappa of 15.7. This cellulose pulp which had a viscosity of 460 ml/g was suitable for use as raw material of dissolving pulps, for example for the production of regenerated fibers and films by the viscose and the lyocell processes and similar processes.

In a further test for beech, Example 6, Alt. 2 was repeated with the addition of magnesium sulphate heptahydrate (Epsom salt), in an amount of 2%, calculated on the solid matter, during stage 2. It was found that the viscosity of the cellulose fraction was increased by 110 units. The pulp was suitable for use as raw material of dissolving pulps.

INDUSTRIAL APPLICABILITY

The present method of treating biomass has a variety of applications such as in the production of biofuels and additives for biofuels, e.g. ethanol, chemicals based on chemical or fermentation processes, in various sulphur-free oxidised lignin applications, e.g. in concrete, as an antioxidant, in asphalt, in carbon fibres and nanotubes, as a binder in fibreboards, particleboards etc. in plastic and polymer foams, in dust control, in the paper industry e.g. as a sizing agent, as a chemical precursor to cresols, catechols, resorsinols, quinones, vanillin and guaiacols, in batteries, as an oxygenate fuel additive, as a lubricating additive, in dispersing agents, complexing agents, flocculants, thickeners and auxiliary agents in coatings paints and adhesives and in oil wells.

The present process is an efficient pretreatment for sugar route biorefineries based on wood or agricultural raw materials.

The method can also be used in dissolving pulp production, dissolving pulp being a key component in the creation of products such as acetate textile fibers, cellophane, photographic film, medical surgery products, and tyre cords among others.

REFERENCE SIGNS

1 Stage 1
2 Stage 2
3 Defibration
SL1 First Spent Liquor
SL2 Second Spent Liquor
P1 First Pulp
P2 Second Pulp

CITATION LIST

Patent Literature

WO 2011/061400
WO 2004/081185
WO 1994/03646
US 2002/148575
CN 102603504
US 2008/032344

Non Patent Literature

Rovio, S. et al., *BioResources* 7(2012), No. 1, 756-777.
Kallioinen, A. et al., *Bioresource Technology* 140(2013), 414-420.
Browning, B. L., *Methods of wood chemistry*. Vol II. Interscience Publishers, New York 1967, 882 p.
Puls, J. et al., Biotechnical utilization of wood carbohydrates after steaming pretreatment. *Appl. Microbiol. Biotechnol.* 22 (1985), pp. 416-423.
Tenkanen, M. and Siika-aho, M., An α-glucuronidase of *Schitzophyllum commune* acting on polymeric xylan. *J. Biotechnil.*, 78 (2000), 2, pp. 149-161.
Sun, R. C. et al., Characteristics of degraded cellulose obtained from steam-exploded wheat straw, *Carbohydrate Research*, Vol. 340 (2005), pp. 97-106.
Alatriste-Mondragon, F. et al., Chemical and enzymatic sequential pretreatment of oat straw for methane production, Bioresource Technology, Vol. 116 (2012), pp. 372-378.

The invention claimed is:

1. A method of fractionation of biomass, in the absence of sulphurous chemicals, comprising the steps of:
    a) providing a lignocellulosic biomass feedstock containing cellulose, hemicelluloses and lignin;
    b) dispersing the biomass feedstock in an aqueous phase in the presence of an alkaline agent in an amount of 0.2 to 4.0 mol/kg at a temperature of 120° C. to 180° C. for a period of 1 to 5 hours, whereby in excess of 30% by dry weight of the hemicellulose present in the biomass feedstock is leached into the aqueous phase;
    c) separating the aqueous phase from the biomass;
    d) defibering the biomass to provide a modified biomass;
    e) contacting the modified biomass in an aqueous phase with an oxidizing agent in the presence of an alkaline agent in an amount of 0.5 to 4.0 mol/kg of the modified biomass at an elevated temperature of 100° C. to 180° C. for a period of 1 to 2 hours, whereby in excess of 20% of the lignin is dissolved in the aqueous medium and a cellulose-enriched biomass is obtained; and
    f)
    g) recovering the cellulose-enriched biomass thus obtained.

2. The method according to claim 1, further comprising recovering the hemicelluloses obtained in step c.

3. The method according to claim 1, further comprising recovering the lignin obtained in step e.

4. The method according to claim 1, wherein the alkaline agent of step e is selected from the group of alkali metal carbonates, bicarbonates and percarbonates and combinations thereof.

5. The method according to claim 4, wherein the alkaline agent of step e further contains an alkali metal hydroxide.

6. The method according to claim 1, wherein the lignocellulosic biomass feedstock is selected from the group of wood, waste or demolition wood, energy crops, pulp, recycled fibres, straw, sugar cane bagasse, agricultural, municipal and industrial wastes and similar compositions which contain carbohydrates, or a mixture thereof.

7. The method according to claim 1, wherein the lignocellulosic biomass feedstock is wood-based, in particular the biomass is derived from or comprises softwood.

8. The method according to claim 1, further comprising using in step c an alkaline agent selected from the group of alkali metal carbonates, bicarbonates, hydroxides and percarbonates and combinations thereof.

9. The method according to claim 1, wherein at least a portion of the alkaline agent in step e is a mixture of sodium carbonate and sodium hydroxide.

10. The method according to claim 1, further comprising recovering the hemicellulose from the aqueous phase of step c and producing biofuel with the recovered hemicellulose.

11. The method according to claim 10, wherein the hemicellulose is subjected to hydrolysis, fermentation, oxidation or a combination thereof.

12. The method according to claim 1, further comprising subjecting the hemicellulose to a further treatment step selected from the group of mechanical treatments, chemical treatments and enzymatic treatments or combinations thereof.

13. The method according to claim 1, wherein the biomass obtained from step c is mechanically processed in step d by refining to provide a modified biomass.

14. The method according to claim 1, wherein the modified biomass obtained from step c after an optional mechanical processing is mechanically separated from the aqueous phase.

15. The method according to claim 1, wherein at least a part of the alkaline agent in the step d is sodium carbonate.

16. The method according to claim 1, wherein the oxidising agent is selected from oxygen and oxygen containing compounds selected from sodium hypochlorite, calcium hypochlorite and hydrogen peroxide.

17. The method according to claim 1, wherein the step of contacting the biomass feedstock is carried out in a partial pressure of oxygen of of 4 to 20 bar.

18. The method according to claim 1, further comprising the step of recovering cellulose and producing biofuel with the recovered cellulose.

19. The method according to claim 18, further comprising subjecting the cellulose to a further treatment step selected from the group of mechanical treatments, chemical treatments and enzymatic treatments or combinations thereof.

20. The method according to claim 18, wherein the cellulose is subjected to hydrolysis, fermentation, oxidation or a combination thereof.

21. The method according to claim 18, wherein ethanol is produced from the cellulose.

22. The method according to claim 18, wherein the cellulose is fermented.

23. The method according to claim 1, further comprising subjecting the lignin to a further treatment step selected from the group of mechanical treatments, chemical treatments and enzymatic treatments or combinations thereof.

24. A method of fractionation of biomass, in the absence of sulphurous chemicals, consisting of the steps of:
   a) providing a lignocellulosic biomass feedstock containing cellulose, hemicelluloses and lignin;
   b) dispersing the biomass feedstock in an aqueous phase in the presence of an alkaline agent in an amount of 0.5 to 3.0 mol/kg at a temperature of 140° C. to 150° C. for a period of 1.5 to 3 hours, whereby from 50% to 70% by dry weight of the hemicellulose present in the biomass feedstock is leached into the aqueous phase;
   c) separating the aqueous phase from the biomass;
   d) defibering the biomass to provide a modified biomass;
   e) contacting the modified biomass in an aqueous phase with an oxidizing agent in the presence of an alkaline agent in an amount of 0.5 to 3.0 mol/kg of the modified biomass at an elevated temperature of 120° C. to 160° C. for a period of 1 to 2 hours, whereby in excess of 80% of the lignin in the modified biomass is dissolved in the aqueous medium and a cellulose-enriched biomass is obtained; and
   f) recovering the cellulose-enriched biomass thus obtained.

* * * * *

UNITED STATES PATENT AND TRADEMARK OFFICE
CERTIFICATE OF CORRECTION

PATENT NO. : 10,266,610 B2
APPLICATION NO. : 15/521310
DATED : April 23, 2019
INVENTOR(S) : Varhimo et al.

It is certified that error appears in the above-identified patent and that said Letters Patent is hereby corrected as shown below:

In the Claims

Claim 1 should be corrected to state the following:
1. A method of fractionation of biomass, in the absence of sulphurous chemicals, comprising the steps of:
    a) providing a lignocellulosic biomass feedstock containing cellulose, hemicelluloses and lignin;
    b) dispersing the biomass feedstock in an aqueous phase in the presence of an alkaline agent in an amount of 0.2 to 4.0 mol/kg at a temperature of 120° C. to 180° C. for a period of 1 to 5 hours, whereby in excess of 30% by dry weight of the hemicellulose present in the biomass feedstock is leached into the aqueous phase;
    c) separating the aqueous phase from the biomass;
    d) defibering the biomass to provide a modified biomass;
    e) contacting the modified biomass in an aqueous phase with an oxidizing agent in the presence of an alkaline agent in an amount of 0.5 to 4.0 mol/kg of the modified biomass at an elevated temperature of 100° C. to 180° C. for a period of 1 to 2 hours, whereby in excess of 20% of the lignin is dissolved in the aqueous medium and a cellulose-enriched biomass is obtained; and
    f) recovering the cellulose-enriched biomass thus obtained.

Signed and Sealed this
Fifteenth Day of October, 2019

Andrei Iancu
*Director of the United States Patent and Trademark Office*